United States Patent
Zhang et al.

(10) Patent No.: US 11,506,930 B2
(45) Date of Patent: Nov. 22, 2022

(54) CURVED-SURFACE VEHICLE-MOUNTED DISPLAY MODULE, VEHICLE-MOUNTED DISPLAY DEVICE, AND VEHICLE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zan Zhang, Beijing (CN); Yue Zhai, Beijing (CN); Wenyang Li, Beijing (CN); Shouyang Leng, Beijing (CN); Rui Han, Beijing (CN); Zeyuan Tong, Beijing (CN); Weining Chi, Beijing (CN); Fengping Wang, Beijing (CN); Zhipeng Zhang, Beijing (CN); Dong Cui, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/187,205

(22) Filed: Feb. 26, 2021

(65) Prior Publication Data
US 2021/0271133 A1 Sep. 2, 2021

(30) Foreign Application Priority Data

Feb. 28, 2020 (CN) .......................... 202010129482.6

(51) Int. Cl.
*G02F 1/13357* (2006.01)
*G02F 1/1335* (2006.01)
*B60K 35/00* (2006.01)

(52) U.S. Cl.
CPC ........ *G02F 1/133603* (2013.01); *B60K 35/00* (2013.01); *G02F 1/133607* (2021.01);
(Continued)

(58) Field of Classification Search
CPC ......... G02F 1/133603; G02F 1/133607; G02F 1/133601; G02F 1/133613;
(Continued)

(56) References Cited

U.S. PATENT DOCUMENTS 9,870,740 B2 * 1/2018 Park ........................ G06F 3/005
10,488,706 B1 * 11/2019 Zha .................. G02F 1/133605
(Continued)

FOREIGN PATENT DOCUMENTS

KR 102125046 B1 * 6/2020

*Primary Examiner* — Tracie Y Green
(74) *Attorney, Agent, or Firm* — Brooks Kushman P.C.

(57) ABSTRACT

The present disclosure provides a curved-surface vehicle-mounted display module, a vehicle-mounted display device and a vehicle. The curved-surface vehicle-mounted display module includes a back plate, a backlight assembly and a liquid crystal panel. The back plate is configured to support the backlight assembly and the liquid crystal panel. The backlight assembly includes a flexible substrate and LEDs. The flexible substrate includes at least one backlight block, each backlight block is provided with a plurality of LEDs, and a distance between two adjacent LEDs is a predefined value.

10 Claims, 2 Drawing Sheets

(52) U.S. Cl.
CPC ............... *B60K 2370/1533* (2019.05); *B60K 2370/332* (2019.05); *B60K 2370/343* (2019.05); *B60K 2370/349* (2019.05)

(58) Field of Classification Search
CPC ......... G02F 1/133608; G02F 1/133308; G02F 1/133606; G02F 1/13362; B60K 35/00; B60K 2370/1533; B60K 2370/332; B60K 2370/343; B60K 2370/349; B60K 2370/1523
See application file for complete search history.

(56) References Cited

U.S. PATENT DOCUMENTS

| | | | | |
|---|---|---|---|---|
| 2012/0113672 | A1* | 5/2012 | Dubrow | G02B 6/0061 977/774 |
| 2014/0125913 | A1* | 5/2014 | Lee | G02B 6/0093 349/58 |
| 2019/0077262 | A1* | 3/2019 | Benjamin | C03C 27/10 |
| 2019/0237685 | A1* | 8/2019 | Kang | H05K 1/189 |
| 2021/0020114 | A1* | 1/2021 | Lee | G09G 3/342 |
| 2022/0036837 | A1* | 2/2022 | Lee | G09G 3/3426 |

* cited by examiner

CURVED-SURFACE VEHICLE-MOUNTED DISPLAY MODULE, VEHICLE-MOUNTED DISPLAY DEVICE, AND VEHICLE

CROSS-REFERENCE TO RELATED APPLICATION

This application claims priority to Chinese Patent Application No. 202010129482.6, filed on Feb. 28, 2020, which is incorporated herein by reference in its entirety.

TECHNICAL FIELD

The present disclosure relates to the field of vehicle-module display module, in particular to a curved-surface vehicle-mounted display module, a vehicle-mounted display device, and a vehicle.

BACKGROUND

Along with the development of vehicle technology, vehicles are used to not only facilitate users' lives but also improve travel quality of the users to some extent. In the travel, video information, e.g., navigation map or a caller Identity (ID), may be provided to the user through a vehicle-mounted display module mounted on a vehicle.

Currently, in the vehicle-mounted display module, local dimming is usually performed through a direct-type backlight source. When a conventional mode where 3014 Light-Emitting Diodes (LEDs) are arranged in a starry-sky manner is adopted, a thickness of the entire vehicle-mounted display module may increase remarkably, so it is impossible to provide a small backlight curvature. In addition, in the related art, the LED of the vehicle-mounted display module has a large size, so it is impossible to control an image finely, and a local dimming effect may be imperfect. When the vehicle-mounted display module has a small curvature and a thickness of the LED is greater than a thickness of a light-guiding member, a part of light emitted by the LED may pass over the light-emitting member, and thereby such a phenomenon as light leakage may occur for the display module at a large viewing angle.

SUMMARY

An object of the present disclosure is to provide a curved-surface vehicle-mounted display module, a vehicle-mounted display device, and a vehicle, so as to solve the problem in the related art where it is impossible to provide a small backlight curvature and control the image finely due to the large size of the curved-surface vehicle-mounted display module and the imperfect local dimming effect.

In one aspect, the present disclosure provides in some embodiments a curved-surface vehicle-mounted display module, including a flexible back plate, a backlight assembly and a liquid crystal panel. The flexible backlight plate is configured to support the backlight assembly and the liquid crystal panel. The backlight assembly includes a lamp plate, the lamp plate includes a flexible substrate and LEDs. The flexible substrate includes a plurality of backlight blocks, each backlight block is provided with a plurality of LEDs, and a distance between two adjacent LEDs is a predefined value.

In a possible embodiment of the present disclosure, the plurality of backlight blocks is arranged in a predetermined direction.

In a possible embodiment of the present disclosure, the plurality of LEDs is arranged in an N*N or N*M matrix form, where N and M are each a natural number.

In a possible embodiment of the present disclosure, the LED is a mini-LED.

In a possible embodiment of the present disclosure, the backlight assembly further includes a diffuser group arranged on the lamp plate.

In a possible embodiment of the present disclosure, the diffuser group includes a plurality of diffusers.

In a possible embodiment of the present disclosure, there is a proportion relationship between the distance between the two adjacent LEDs and an optical distance, and the optical distance is a distance between the LED and the diffuser group.

In a possible embodiment of the present disclosure, a proportionality coefficient of the proportion relationship is within a range of 1 to 1.5.

In a possible embodiment of the present disclosure, the backlight assembly further includes a quantum-dot film and a prism which are arranged between the diffuser group and the liquid crystal panel.

In a possible embodiment of the present disclosure, the curved-surface vehicle-mounted display module further includes a reflective polarized brightness enhancement film arranged between the prism and the liquid crystal panel.

In a possible embodiment of the present disclosure, the curved-surface vehicle-mounted display module further includes a compensation film arranged between the prism and the reflective polarized brightness enhancement film.

In a possible embodiment of the present disclosure, the liquid crystal panel includes a color filter substrate and a thin film transistor substrate.

In a possible embodiment of the present disclosure, each backlight block is of at least one of a rectangular shape, a square shape, a polygonal shape, a circular shape and an irregular shape.

In a possible embodiment of the present disclosure, when the backlight block is of a rectangular or square shape and a size of the liquid crystal panel is within a range of 11 inches to 13 inches, a size of any side of the backlight block is within a range of 7 mm to 8.5 mm.

In another aspect, the present disclosure provides in some embodiments a vehicle-mounted display device including the above-mentioned curved-surface display module.

In yet another aspect, the present disclosure provides in some embodiments a vehicle including the above-mentioned vehicle-mounted display device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In addition, for clarification, any known function and member will not be described hereinafter.

Figure 1:
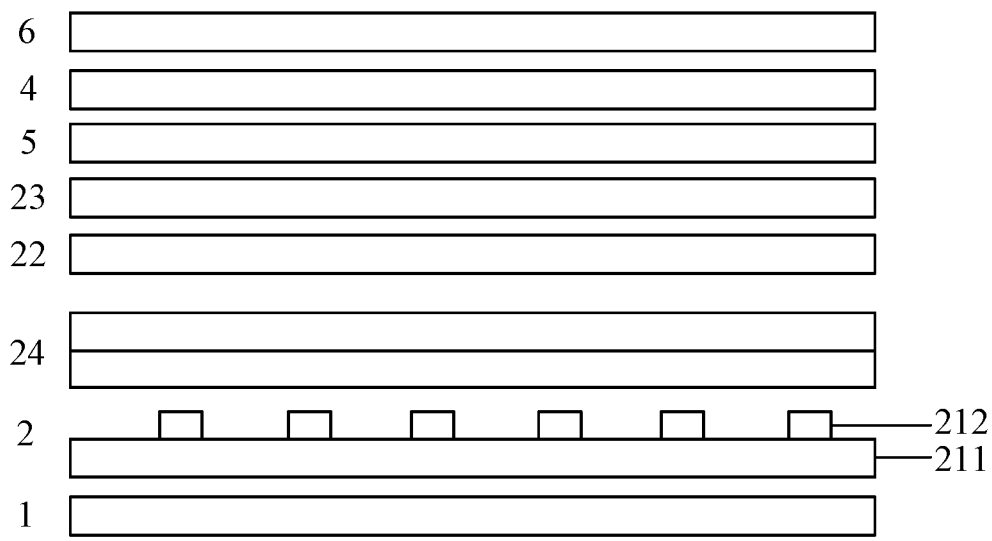
FIG. 1 is a schematic view showing a curved-surface vehicle-mounted display module according to one embodiment of the present disclosure.

As shown in FIG. 1, the present disclosure provides in some embodiments a curved-surface vehicle-mounted display module, which includes a back plate 1, a backlight assembly 2 and a liquid crystal panel 6. The back plate 1 is configured to support the backlight assembly 2 and the liquid crystal panel 6.

Further, the backlight assembly 2 may include a lamp plate 21, and the lamp plate may include a flexible substrate 211 and LEDs. In the embodiments of the present disclosure, the LED may be, but not limited to, a mini-LED 212.

The flexible substrate 211 and the liquid crystal panel 6 may be arranged sequentially on the back plate 1. Here, the flexible substrate 211 may be a Flexible Printed Circuit (FPC), and it may be made of a flexible material, so as to theoretically achieve a posture at any curvature, thereby to bend the entire curved-surface vehicle-mounted display module at a specific curvature. Here, the curved-surface vehicle-mounted display module may be bent at a single curvature, or at different curvatures.

Further, the flexible substrate 211 may be flexible, and it may be formed in various shapes so as to be adapted to a shape of the curved-surface vehicle-mounted display module. For example, the flexible substrate 211 may be formed in any shape, so as to achieve the backlight display in any shape, i.e., the flexible substrate 211 may be applied to various scenarios. In the case that the flexible substrate 211 has a relatively large size and a part of the flexible substrate 211 is damaged or the mini-LEDs 212 at a certain region are damaged, the damaged part of the flexible substrate 211 or a part of the flexible substrate 11 where the mini-LEDs 212 are damaged may be cut off. Of course, when a part of the flexible substrate 211 has been cut off, the corresponding mini-LEDs 212 may also be removed. At this time, the remaining flexible substrate 211 may be applied to a scenario where a small-size flexible substrate 211 is required, so as to save resources to some extent, thereby to improve the utilization of the flexible substrate 211.

The mini-LEDs 212 may be arranged on the flexible substrate 11. Here, the mini-LED 212 is a light-emitting element and serves as a backlight source. It is able for the mini-LEDs to achieve a light-emission function at any curvature in combination with the flexible substrate 211.

In addition, through the mini-LEDs 212, it is also able to reduce a size of the entire curved-surface vehicle-mounted display module. For example, the mini-LED 212 may emit normal white light, or a blue mini-LED 212 may emit blue light. Based on the structure in the embodiments of the present disclosure, the curved-surface vehicle-mounted display module may emit light at a full spectrum, so as to provide a better display effect.

Figure 2:
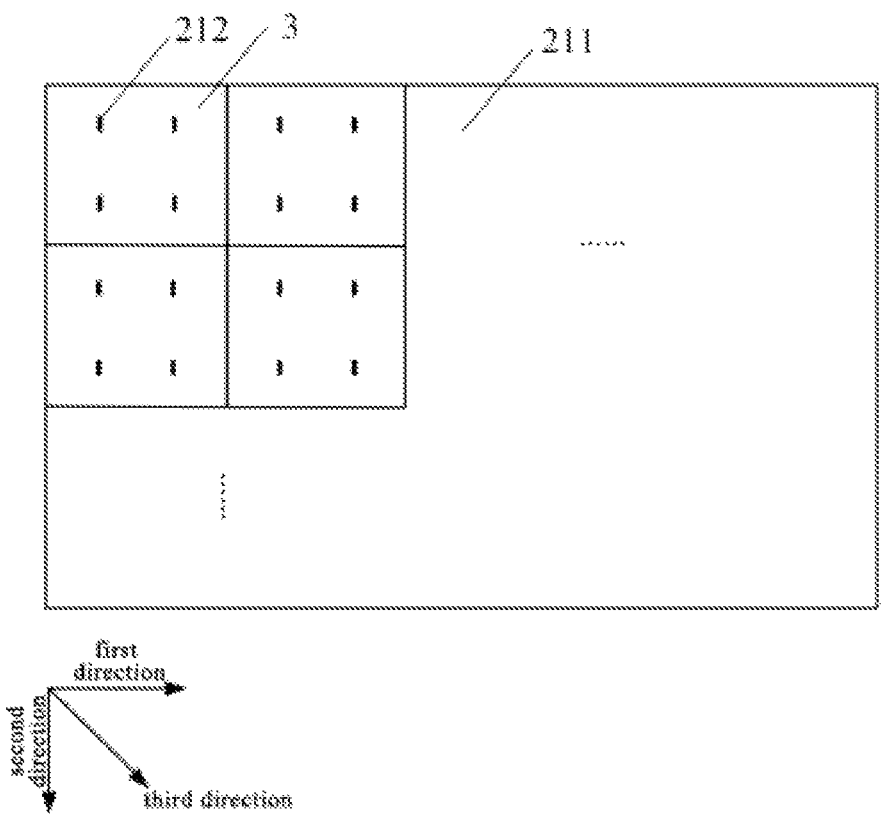
FIG. 2 is a schematic view showing mini-LEDs arranged in a rectangular array form according to one embodiment of the present disclosure.

FIG. 2 shows a layout of the flexible substrate 211 in the curved-surface vehicle-mounted display module in the embodiments of the present disclosure. Based on a display requirement of the curved-surface vehicle-mounted display module, the flexible substrate 211 may include at least one backlight block 3 for local dimming. Of course, the local dimming may be associated with a division mode of the backlight blocks 3, so an arrangement mode of the backlight blocks 3 and a size of each backlight block 3 may be set according to the desired local dimming effect. When more backlight blocks 3 are provided, it is able to perform the display control in more local details as possible.

For example, when more backlight blocks 3 are provided, the plurality of backlight blocks 3 may be arranged sequentially and consecutively on the flexible substrate 211 in a predetermined direction, and the local dimming may be controlled with respect to each backlight block 3.

For another example, each backlight block 3 may be of a rectangular or square shape according to the practical need. Of course, the size of each backlight block 3 may be set in accordance with a size of the flexible substrate 211 and an actual display demand, and the shape, the size and the quantity of the backlight blocks 3 will not be particularly defined herein. Of course, each backlight block 3 may not be too small (e.g., its side may not have a length of 1 mm). In the curved-surface vehicle-mounted display module, when each backlight block 3 is too small, more backlight blocks 3 may be provided, and at this time, the curved-surface vehicle-mounted display module may operate slowly and a resultant driving cost may be relatively high.

Further, each backlight block 3 may be provided with a plurality of mini-LEDs 212 arranged in an array form, and a distance between two adjacent mini-LEDs 212 may be a predetermined value. Here, for example, the mini-LEDs 212 may be arranged uniformly in an N*N matrix form or an N*M matrix form, where N and M are each a natural number.

When the shape and size of each backlight block 3 have been determined, a fin control level of the display effect may be adjust through setting the quantity and positions of the mini-LEDs 212 in each backlight block 3. For example, fewer mini-LEDs 212 may be provided, so as to provide a large distance between the two adjacent mini-LEDs 212, thereby to reduce the fine control level of an image. In addition, more mini-LEDs 212 may be provided, so as to provide a small distance between the two adjacent mini-LEDs 212, thereby to increase the fine control level of the image. Hence, it is able to adjust the quantity of the mini-LEDs 212 according to the practical need and an application environment, thereby to adjust the fine control level of the image.

It should be appreciated that, apart from the rectangular or square shape, the backlight block 3 may also be of any other shape, e.g., a polygonal shape, a circular shape or an irregular shape, and the mini-LEDs 212 may be arranged in accordance with the shape of the backlight block 3.

Figure 3:
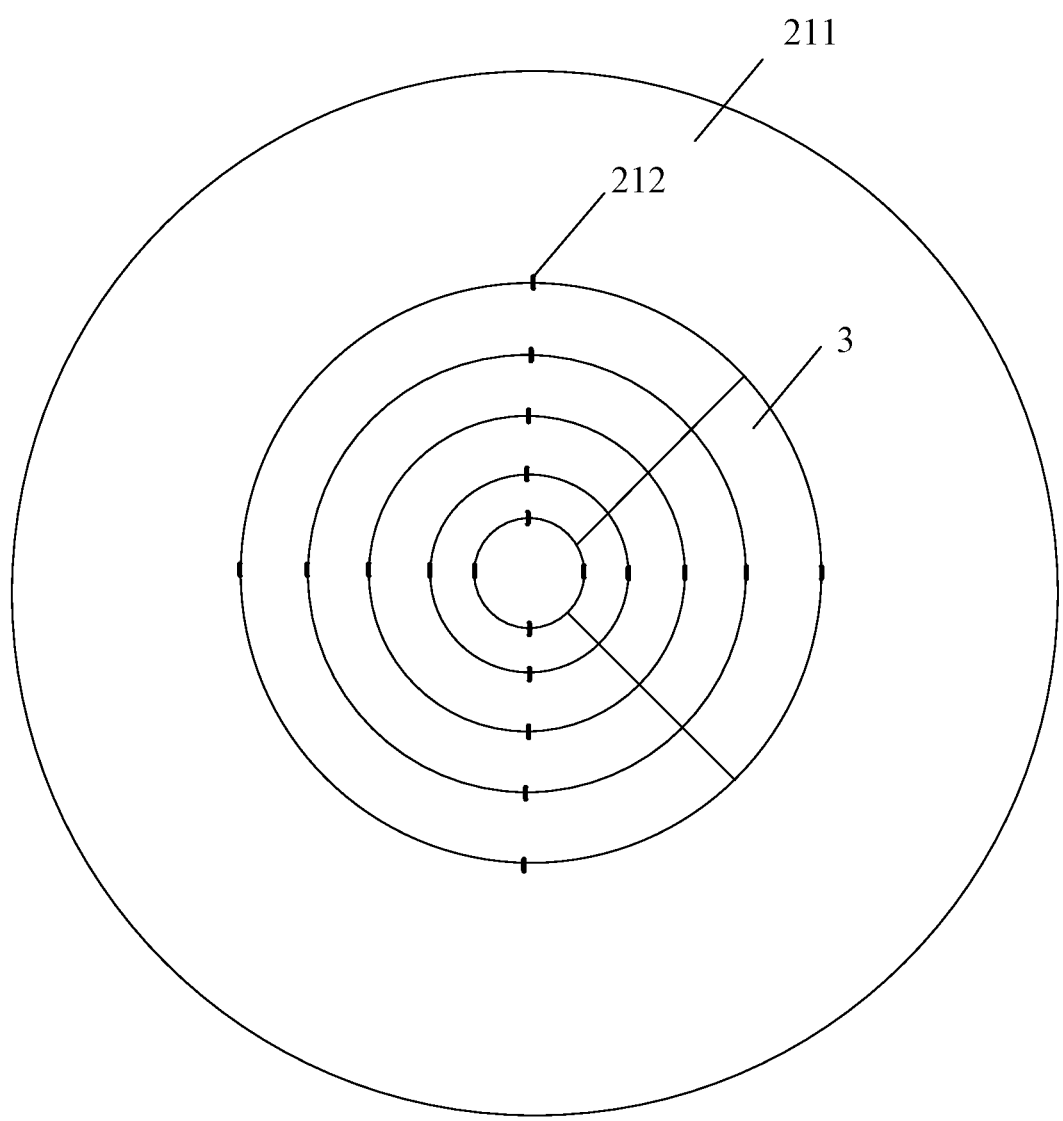
FIG. 3 is a schematic view showing the mini-LEDs arranged in another form according to one embodiment of the present disclosure.

As shown in FIG. 3, when the backlight block 3 is of a circular shape, the mini-LEDs 212 may be arranged on a circle with a center of the backlight block 3 as a circle center and with a half of a diameter of the circular backlight block 3 as a diameter, and sectors formed by every two adjacent mini-LEDs 212 and the circle center may be the same. In other words, the shape of the backlight block 3 may be adjusted in accordance with a shape of a display panel and a shape of a display region, which will not be particularly defined herein.

Further, the arrangement modes of the mini-LEDs 212 in different backlight blocks 3 may be the same or different from each other, which will not be particularly defined herein. For example, the mini-LEDs 212 may be arranged differently in the backlight blocks 3 in specific scenarios. When two regions of the curved-surface vehicle-mounted display modules have different positioning control requirements, the mini-LEDs 212 may be arranged in a first arrangement mode in the backlight block 3 corresponding to a first region, and in a second arrangement mode in the backlight block 3 corresponding to a second region, so that a pitch between the two adjacent mini-LEDs 212 in the backlight block 3 corresponding to the first region may be different from a pitch between the two adjacent mini-LEDs 212 in the backlight block 3 corresponding to the second region.

The backlight assembly 2 may further include a diffuser group 24 arranged on the lamp plate 21, and the diffuser group may include a plurality of diffusers laminated one on another. The diffuser group 24 is mainly configured to receive light emitted by the mini-LEDs 212 on the flexible substrate 211 and diffuse the light to form a uniform area light source. In the embodiments of the present disclosure, for example, the diffuser group 24 may consist of two diffusers laminated one on another. When the two diffusers are laminated one on another, the diffuser adjacent to the back plate 1 may converge the light emitted by the mini-LEDs 212 and uniformly project the converged light to a direction away from the back plate 1, and the diffuser away from the back plate 1 may atomize the light passing through a prism 23 and allow the atomized light to pass therethrough uniformly. In this regard, it is able to improve the uniformity of the backlight brightness, improve an atomization level, and protect the other optical components in the display module.

One of the objects in the embodiments of the present disclosure is to reduce a thickness of the curved-surface vehicle-mounted display module. Based on the structure of the curved-surface vehicle-mounted display module, the thickness of the curved-surface vehicle-mounted display module may be determined by an optical distance (OD), and the optical distance may be a distance between the mini-LED 212 and the diffuser group 24.

Further, the optical distance may be determined in accordance with the quantity of the mini-LEDs 212 in each backlight block 3. Considering the quantity and the arrangement mode of the mini-LEDs 212 in each backlight block 3, the optical distance may also be associated with the distance between the two adjacent mini-LEDs 212 in each backlight block 3. For example, based on an expected thickness of the curved-surface vehicle-mounted display module, a proportion coefficient of a proportion relationship between the distance between the two adjacent mini-LEDs in the backlight block 3 and the optical distance may be within a range of 1 to 1.5.

Although a conventional large-size LED is replaced with a small-size mini-LED 212 in the embodiments of the present disclosure, in order to ensure the display effect, it is necessary to increase the quantity of the mini-LEDs 212 in the curved-surface vehicle-mounted display module. However, due to the increase in the quantity of the mini-LEDs 212, the power consumption of the curved-surface vehicle-mounted display module may increase too, and thereby an energy efficiency index may be reduced. Hence, in the embodiments of the present disclosure, the distance between the two adjacent mini-LEDs 212 may be set as an appropriate value in accordance with the power consumption. In this regard, it is able to not only reduce the power consumption of the display module and increase the energy efficiency index, but also improve a color richness level through the integration of red, green and blue (RGB), and improve a visual effect.

According to the embodiments of the present disclosure, the plurality of LEDs may be arranged in a rectangular array form on the flexible substrate on a region basis, so as to achieve the backlight display at any single curvature, or achieve the backlight display at two curvatures and in any shape.

Usually, a size of the liquid crystal panel may be within a range of 10 inches to 13 inches. In the embodiments of the present disclosure, the curved-surface vehicle-mounted display module may have a size of 12.3 inches, i.e., it may have a length of about 292.1 mm and a width of about 201.42 mm.

As mentioned hereinabove, in FIG. 2, the plurality of rectangular backlight blocks may be formed on the flexible substrate 211. Here, a size of each backlight block 33 on the flexible substrate 211 may be within a range of 7 mm*7 mm to 8.5 mm*8.5 mm, and for example, totally 600 backlight blocks 3 may be formed, so as to achieve a better local dimming effect.

The plurality of mini-LEDs 212 may be arranged in an array form in each backlight block 3. For example, in a 12.3-inch curved-surface vehicle-mounted display module, the plurality of backlight blocks 3 with a size of 7.3 mm*7.3 mm may be arranged on the flexible substrate 211, four mini-LEDs 212 may be arranged uniformly in a 2*2 array form in each backlight block 3 (i.e., two in each row and two in each column), and the distance between two adjacent mini-LEDs 212 may be 3.65 mm. The mini-LEDs 212 in each row may be arranged in a first direction, and the mini-LEDs 212 in each column may be arranged in a second direction perpendicular to the first direction. Hence, in the first direction and the second direction, the distance between every two adjacent mini-LEDs 212 in the backlight block 3 may be the same.

When a single-color mini-LED, e.g., a blue mini-LED, is used, in order to provide the light at a full spectrum and improve a color richness level, referring to FIG. 1 again, the backlight assembly 2 may further include a quantum-dot film 22 and a prism 23 arranged on the lamp plate 21. The quantum-dot film 22 and the prism 23 may be arranged between the diffuser group 24 and the liquid crystal panel 6.

To be specific, the quantum-dot film 22 may be arranged on the lamp plate 21. As a new nanometer material with a unique light characteristic, the quantum-dot film 22 may be used to convert high-energy light, e.g., blue light, to red light and green light efficiently. In this regard, the quantum-dot film 22, as a light conversion layer, may absorb the blue light, and emit the light in other colors which is combined with the remaining blue light to form white light. In other words, the quantum-dot film may be formed and irradiated with the blue light emitted by the LED to emit the light at the full spectrum, so as to finely adjust the backlight, remarkably improve the display effect within the gamut, and display the image in richer colors. To be specific, quantum dots may be dispersed on a barrier resin material, then the barrier resin material may be subjected to film formation, and then the resultant film may be packaged by optical-grade barrier films, so as to form the quantum-dot film. The quantum dot is a nanometer-level semiconductor, and when a certain electric field or light pressure is applied to the nanometer-level semiconductor, the quantum dot may emit the light at a specific frequency, and the frequency of the light may change along with a size of the semiconductor. Hence, a color of the light emitted by the nanometer-level semiconductor may be controlled through adjusting the size thereof. For example, the mini-LED 212 may emit the blue light, and the light at the full spectrum may be generated through the quantum-dot film 22 in combination with the quantum dots, so as to enable the curved-surface vehicle-mounted display module to display the colors in a wide gamut, thereby to improve the user experience. In addition, through the quantum-dot film 22, it is able to prevent a volume of the curved-surface vehicle-mounted display module from increasing, thereby to reduce the cost thereof.

Further, the prism 23 may be arranged on the quantum-dot film 22, and a reflective polarized brightness enhancement film 4 may be arranged between the prism 23 and the liquid crystal panel 6. Light passing through the prism 23 may be selectively reflected by the reflective polarized brightness enhancement film 4, so as to prevent the light from being absorbed by a polarizer and reuse a part of the light at a full viewing angle of the curved-surface vehicle-mounted display module, thereby to increase the brightness through the prism 23 and the reflective polarized brightness enhancement film 4. As compared with the other brightness enhancement film, it is able for the reflective polarized brightness enhancement film 4 to improve the luminous efficiency in a better manner, e.g., by at least 30% after testing.

In the embodiments of the present disclosure, the curved-surface vehicle-mounted display module may further include a compensation film 5 arranged between the prism 23 and the reflective polarized brightness enhancement film 4. It is relatively easy to control the alignment of liquid crystal molecules, so the compensation film may be made of a liquid crystal material, so as to acquire a high-molecular thin film with a higher alignment level. In addition, through the high-molecular thin film with a higher alignment level, it is able to increase a birefringence value, thereby to further reduce a thickness of the compensation film 5. In addition, when a light transmittance of the compensation film 5 and a light transmittance of a conventional optical compensation film within a visible light range are measured by a spectrophotometer, it is found that a large light transmittance may be acquired through reducing the thickness of the compensation film 5. Hence, in the embodiments of the present disclosure, through the thin compensation film 5, it is able to improve the light transmittance to some extent.

The liquid crystal panel 6 may be arranged at an outermost side of the curved-surface vehicle-mounted display module, and it may include a color filter (CF) substrate and a thin film transistor (TFT) substrate. Generally speaking, the liquid crystal panel 6 may also be made of a flexible material, but usually a curvature of the TFT substrate is limited.

Each of the CF substrate and the TFT substrate usually has a thickness of 0.5 mm. In the embodiments of the present disclosure, in order to minimize the thickness of the curved-surface vehicle-mounted display module and provide different curvatures, each of the CF substrate and the TFT substrate may have a thickness of 0.2 mm. In the case that a local dimming function has been enabled for the mini-LEDs 212, in order to exceed the limitation on the curvature of the TFT substrate, the CF substrate and the TFT substrate each having a thickness of 0.2 mm may be used in conjunction with the flexible substrate 211, so it is able to bend the curved-surface vehicle-mounted display module at two curvatures or at a smaller curvature.

Further, when the display module is bent at a small curvature and a thickness of the LED is greater than a thickness of a light-guiding member, a part of the light emitted by the LED may pass over the light-guiding member, and the light emitted by the LEDs may influence each other, thereby such a phenomenon as light leakage may occur for the display module. In the embodiments of the present disclosure, through the combination of the compensation film for achieving a compensation effect at a large viewing angle with the CF substrate and the TFT substrate each with a thickness of 0.2 mm and in conjunction with the local dimming function, it is able to not only reduce the occurrence of an inverted image, but also reduce a transmittance of a black image at a large viewing angle, prevent the mini-LEDs 212 in the adjacent backlight blocks 3 from influencing each other, and prevent the occurrence of the light leakage at the full viewing angle even in the case of a small curvature.

The present disclosure further provides in some embodiments a vehicle-mounted display device which includes the above-mentioned curved-surface vehicle-mounted display module. The vehicle-mounted display device with different thicknesses, different curvatures and a backlight source in any shape may be selected according to a desired local dimming effect, so as to achieve different fine control levels for an image, thereby to improve the travel quality of a user to some extent.

The present disclosure further provides in some embodiments a vehicle including the above-mentioned vehicle-mounted display device. For example, the vehicle-mounted display device may be selected in accordance with a model, a main purpose, a level and a use requirement of the vehicle.

Although the preferred embodiments are described above, a person skilled in the art may make modifications and alterations to these embodiments in accordance with the basic concept of the present disclosure. So, the appended claims are intended to include the preferred embodiments and all of the modifications and alterations that fall within the scope of the present disclosure.

In the detailed description above, various features have been combined in one or more examples to improve the stringency of the depiction. However, it should be clear in this instance that the above description is of a merely illustrative but in no way limiting nature. It serves to cover all alternatives, modifications and equivalents of the various features and exemplary embodiments. Many other examples will be immediately and directly clear to a person skilled in the art on the basis of his knowledge in the art in view of the above description.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A curved-surface vehicle-mounted display module, comprising a flexible back plate, a backlight assembly and a liquid crystal panel, wherein the flexible backlight plate is configured to support the backlight assembly and the liquid crystal panel, the backlight assembly comprises a lamp plate, the lamp plate comprises a flexible substrate and Light-Emitting Diodes (LEDs), the flexible substrate comprises a plurality of backlight blocks, each backlight block is provided with a plurality of LEDs, and a distance between two adjacent LEDs is a predefined value,
 wherein the backlight assembly further comprises a diffuser group arranged on the lamp plate,
 wherein there is a proportion relationship between the distance between the two adjacent LEDs and an optical distance, and the optical distance is a distance between the LED and the diffuser group,
 wherein a proportionality coefficient of the proportion relationship is within a range of 1 to 1.5,
 wherein the backlight assembly further comprises a quantum-dot film and a prism which are arranged between the diffuser group and the liquid crystal panel,
 wherein the curved-surface vehicle-mounted display module further includes a reflective polarized brightness enhancement film arrangement between the prism and the liquid crystal panel, and a compensation film arranged between the prism and the reflective polarized brightness enhancement film.

2. The curved-surface vehicle-mounted display module according to claim 1, wherein the plurality of backlight blocks is arranged in a predetermined direction.

3. The curved-surface vehicle-mounted display module according to claim 1, wherein the plurality of LEDs is arranged in an N*N or N*M matrix form, where N and M are each a natural number.

4. The curved-surface vehicle-mounted display module according to claim 1, wherein the LED is a mini-LED.

5. The curved-surface vehicle-mounted display module according to claim 1, wherein the diffuser group comprises a plurality of diffusers.

6. The curved-surface vehicle-mounted display module according to claim 1, wherein the liquid crystal panel comprises a color filter substrate and a thin film transistor substrate.

7. The curved-surface vehicle-mounted display module according to claim 1, wherein each backlight block is of at least one of a rectangular shape, a square shape, a polygonal shape, a circular shape and an irregular shape.

8. The curved-surface vehicle-mounted display module according to claim 7, wherein when the backlight block is of a rectangular or square shape and a size of the liquid crystal panel is within a range of 11 inches to 13 inches, a size of any side of the backlight block is within a range of 7 mm to 8.5 mm.

9. A vehicle-mounted display device, comprising the curved-surface vehicle-mounted display module according to claim 1.

10. A vehicle, comprising the vehicle-mounted display device according to claim 9.

* * * * *